United States Patent
Takahashi et al.

(10) Patent No.: US 11,804,920 B2
(45) Date of Patent: Oct. 31, 2023

(54) SIGNAL TRANSFER MANAGEMENT DEVICE, SIGNAL TRANSFER MANAGEMENT METHOD AND SIGNAL TRANSFER MANAGEMENT PROGRAM

(71) Applicant: NIPPON TELEGRAPH AND TELEPHONE CORPORATION, Tokyo (JP)

(72) Inventors: Keita Takahashi, Musashino (JP); Naotaka Shibata, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/800,136

(22) PCT Filed: Feb. 18, 2020

(86) PCT No.: PCT/JP2020/006254
§ 371 (c)(1),
(2) Date: Aug. 16, 2022

(87) PCT Pub. No.: WO2021/166070
PCT Pub. Date: Aug. 26, 2021

(65) Prior Publication Data
US 2023/0075721 A1 Mar. 9, 2023

(51) Int. Cl.
*H04J 3/06* (2006.01)
*G06F 13/00* (2006.01)
(Continued)

(52) U.S. Cl.
CPC ............ *H04J 3/0667* (2013.01); *G06F 13/38* (2013.01); *G06F 13/42* (2013.01); *H04J 3/0682* (2013.01)

(58) Field of Classification Search
CPC ...... H04J 3/0617; H04J 3/0635; H04J 3/0638; H04J 3/0658; H04J 3/0667; H04J 3/0682;
(Continued)

(56) References Cited

U.S. PATENT DOCUMENTS 8,416,812 B2 * 4/2013 Radulescu ............... G04G 7/00
370/503
8,576,883 B2 * 11/2013 Lansdowne ........... H04J 3/0673
370/503
(Continued)

FOREIGN PATENT DOCUMENTS

JP 2010213101 A 9/2010
JP 2013131934 A 7/2013
(Continued)

OTHER PUBLICATIONS

LAN/MAN Standards Committee of the IEEE Computer Society, IEEE Standard for Local and metropolitan area networks—Time-Sensitive Networking for Fronthaul, IEEE Std 802.1CM™—2018, Jun. 8, 2018.

*Primary Examiner* — Alpus Hsu
(74) *Attorney, Agent, or Firm* — Harness, Dickey & Pierce, P.L.C.

(57) ABSTRACT

A signal transfer management apparatus manages operations of a plurality of signal transfer devices. The signal transfer management apparatus includes a gate calculation unit configured to calculate a gate start time of each of uplink time gates and a gate start time of each of downlink time gates of a plurality of signal transfer devices and open each of the time gates, a comparison unit configured to compare uplink time synchronization messages from the plurality of slave devices to a master device and detect a conflict between the uplink time synchronization messages, and an offset unit configured to, when the comparison unit detects a conflict, adjusts the gate start time of each of the uplink time gates
(Continued)

and the gate start time of each of the downlink time gates of the signal transfer devices and set the adjusted gate start times in the signal transfer devices.

7 Claims, 8 Drawing Sheets

(51) Int. Cl.
*G06F 13/38* (2006.01)
*G06F 13/42* (2006.01)

(58) Field of Classification Search
CPC ........ H04J 3/0697; G06F 13/38; G06F 13/42; H04W 56/001
See application file for complete search history.

(56) References Cited

U.S. PATENT DOCUMENTS

| | | | |
|---|---|---|---|
| 8,681,915 B2* | 3/2014 | Buhl | H04J 3/0638 |
| | | | 375/267 |
| 9,112,629 B2* | 8/2015 | Ruffini | H04J 3/0679 |
| 9,407,389 B2* | 8/2016 | Mizutani | H04L 43/0858 |
| 9,825,724 B2* | 11/2017 | Licardie | H04J 3/0658 |
| 2016/0359979 A1* | 12/2016 | Ito | H04L 12/403 |
| 2020/0146101 A1* | 5/2020 | Tsuboi | H04W 56/0045 |
| 2021/0006344 A1* | 1/2021 | Chen | G01S 19/14 |

FOREIGN PATENT DOCUMENTS

| | | |
|---|---|---|
| JP | 2014003384 A | 1/2014 |
| JP | 2014216669 A | 11/2014 |

\* cited by examiner

SIGNAL TRANSFER MANAGEMENT DEVICE, SIGNAL TRANSFER MANAGEMENT METHOD AND SIGNAL TRANSFER MANAGEMENT PROGRAM

CROSS-REFERENCE TO RELATED APPLICATIONS

This application is a 371 U.S. National Phase of International Application No. PCT/JP2020/006254, filed on Feb. 18, 2020. The entire disclosure of the above application is incorporated herein by reference.

TECHNICAL FIELD

The present invention relates to signal transfer techniques for a system that performs time synchronization by transmitting and receiving a time synchronization message using a packet network such as an Ether (trade name) frame.

BACKGROUND ART

Precision Time Protocol (PTP) is standardized as a time synchronization scheme using an Ether (trade name) frame. In the PTP, a dedicated time synchronization message is transmitted and received between a master device and a slave device of a clock, and time synchronization is performed between the master device and the slave device based on the time at which the transmission and reception have been performed (see NPL 1).

CITATION LIST

Non Patent Literature

NPL 1: "Time-Sensitive Networking for Fronthaul", IEEE Std P802.1CM, May 7, 2018

SUMMARY OF THE INVENTION

Technical Problem

In a network switch (referred to as a "signal transfer device") that forms a packet network in a transmission path of a time synchronization message, fluctuation of the delay time of the time synchronization message occurs due to congestion with other traffic. Thus, the prior art proposes a method of preferably transmitting a time synchronization message dedicated to the PTP even in the congested time by providing, in a signal transfer device, a time gate dedicated for transmitting a time synchronization message. However, even though the time gate works to be unaffected by other traffic than the time synchronization message, when a plurality of slave devices are subordinate to the master device, the conflict between the time synchronization messages occurs in a signal transfer device that merges a plurality of uplink time synchronization messages from the plurality of slave devices to the master device, and the uplink time synchronization message is delayed. Thus, the delay time differs between an uplink and a downlink, and the time synchronization accuracy decreases.

An object of the present invention is to provide a signal transfer management apparatus, a signal transfer management method, and a signal transfer management program capable of avoiding a conflict between uplink time synchronization messages in a signal transfer device and eliminating a difference in delay time between an uplink time synchronization message and a downlink time synchronization message, to improve the accuracy of time synchronization.

Means for Solving the Problem

According to the present invention, a signal transfer management apparatus manages operations of a plurality of signal transfer devices in a system in which the signal transfer devices forming a packet network transmit and receive time synchronization messages including time information between a master device having a reference time and a plurality of slave devices. The signal transfer management apparatus includes a gate calculation unit configured to calculate a gate start time of an uplink time gate and a gate start time of a downlink time gate of each of the signal transfer devices and open each time gate, a comparison unit configured to compare uplink time synchronization messages from the plurality of slave devices to the master device and detect a conflict between the uplink time synchronization messages, and an offset unit configured to, when the comparison unit detects the conflict between the uplink time synchronization messages of the signal transfer devices, adjust the gate start time of the uplink time gate and the gate start time of the downlink time gate of each of the signal transfer devices and set the adjusted gate start time in the signal transfer devices.

According to the present invention, there is provided a signal transfer management method of managing operations of a plurality of signal transfer devices in a system in which the signal transfer devices forming a packet network transmit and receive time synchronization messages including time information between a master device having a reference time and a plurality of slave devices. The signal transfer management method includes a gate calculation process of calculating gate start times of uplink time gates and gate start times of downlink time gates of the plurality of signal transfer devices and opening each of the time gates, a comparison process of comparing uplink time synchronization messages from the plurality of slave devices to the master device and detecting a conflict between the uplink time synchronization messages, and an offset process of, when the comparison process detects the conflict between the uplink time synchronization messages of the signal transfer devices, adjusting the gate start time of the uplink time gate and the gate start time of the downlink time gate of each of the signal transfer devices and setting the adjusted gate start times in the corresponding signal transfer devices.

According to the present invention, a signal transfer management program causes a computer to execute the processes executed by the signal transfer management method.

Effects of the Invention

The signal transfer management apparatus, the signal transfer management method, and the signal transfer management program according to the present invention is capable of avoiding a conflict between uplink time synchronization messages in a signal transfer device and eliminating a difference in delay time between an uplink time synchronization message and a downlink time synchronization message, to improve the accuracy of time synchronization.

DESCRIPTION OF EMBODIMENTS

Hereinafter, the embodiments of the signal transfer management apparatus, the signal transfer management method, and the signal transfer management program according to the present invention will be described with reference to the drawings.

Figure 1:
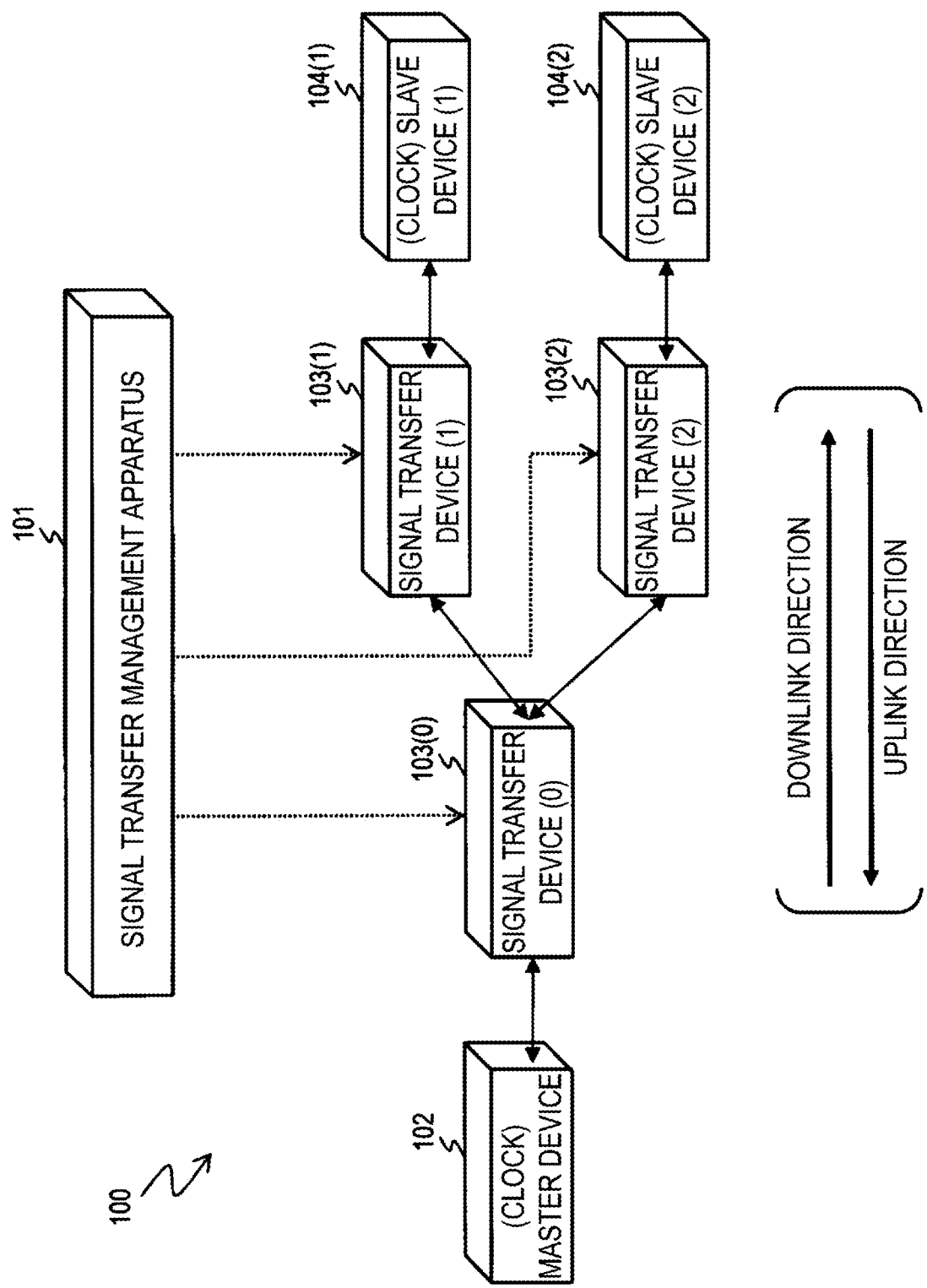
FIG. 1 is a diagram illustrating an example of a time synchronization system.

FIG. 1 illustrates an example of a time synchronization system 100. In FIG. 1, the time synchronization system 100 includes a signal transfer management apparatus 101, a master device 102, a signal transfer device 103(0), a signal transfer device 103(1), a signal transfer device 103(2), a slave device 104(1), and a slave device 104(2). Here, a plurality of blocks having a plurality of similar functions like the signal transfer device 103(0), the signal transfer device 103(1), and the signal transfer device 103(2), or the slave device 104(1) and the slave device 104(2) is described by adding (number) to the end of the reference sign, but when descriptions common to a plurality of blocks are given, the (number) at the end of the reference sign is omitted like a "signal transfer device 103" and a "slave device 104" in the description.

In FIG. 1, the master device 102 has a clock as the reference time of the time synchronization system 100. The time of a clock of each of the slave device 104(1) and the slave device 104(2) is synchronized to the time of the clock of the master device 102. In the time synchronization system 100, a time synchronization message is transmitted and received between the master device 102 and a plurality of the slave devices 104 in order to achieve time synchronization. A downlink time synchronization message is output from the master device 102 to the signal transfer device 103(0), and is output from the signal transfer device 103(0) to the signal transfer device 103(1) and the signal transfer device 103(2). Thus, the downlink time synchronization message is output from the signal transfer device 103(1) to the slave device 104(1), and from the signal transfer device 103(1) to the slave device 104(2).

An uplink time synchronization message from the slave device 104(1) to the master device 102 is output to the signal transfer device 103(0) via the signal transfer device 103(1). Similarly, an uplink time synchronization message from the slave device 104(2) to the master device 102 is output to the signal transfer device 103(0) via the signal transfer device 103(2).

Here, the signal transfer device 103(0), the signal transfer device 103(1), and the signal transfer device 103(2) are network switches forming a packet network such as an Ether (trade name) frame.

In this manner, in the time synchronization system 100, it is possible to achieve time synchronization by transmitting and receiving the time synchronization message between the master device 102 and the slave device 104.

Figure 2:
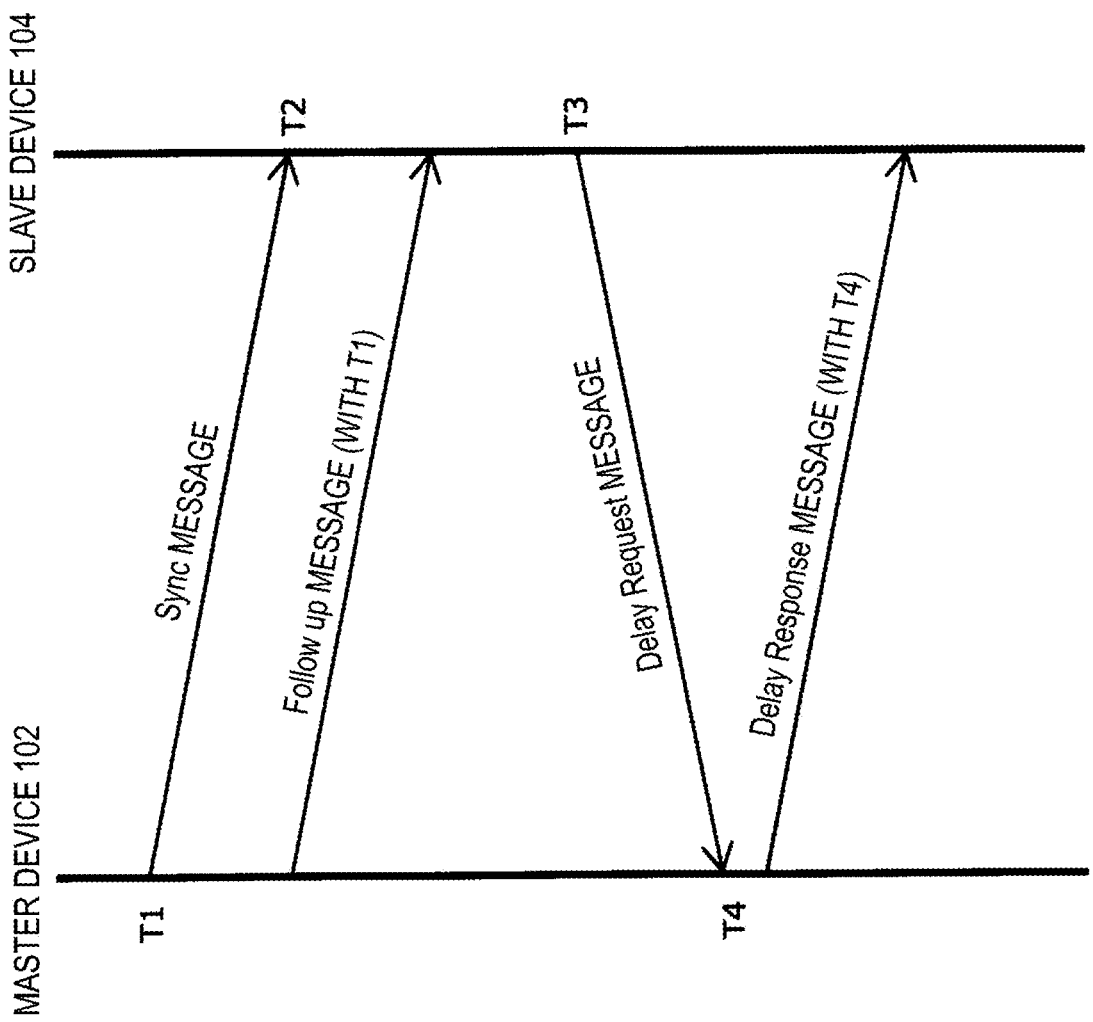
FIG. 2 is a diagram illustrating a time synchronization sequence when time synchronization is performed between a master device and a slave device.

FIG. 2 illustrates a time synchronization sequence when time synchronization is performed between the master device 102 and the slave device 104. In FIG. 2, four types of timestamps (T1, T2, T3, and T4) of a Sync message, a Follow Up message, a Delay Request message, and a Delay Response message are transmitted and received between the master device 102 and the slave device 104. Here, a time T1 indicates the time at which the master device 102 transmits the Sync message to the slave device 104. A time T2 indicates the time at which the slave device 104 receives the Sync message from the master device 102. A time T3 indicates the time at which the slave device 104 transmits the Delay Request message to the master device 102. A time T4 indicates the time at which the master device 102 receives the Delay Request message from the slave device 104.

In FIG. 2, in a case of obtaining a delay time when a message is transmitted from the master device 102 to the slave device 104, the master device 102 transmits a Sync message, and the slave device 104 records the reception time T2 of the Sync message. Then, the master device 102 sets the transmission time T1 of the Sync message in the Follow up message and transmits a Follow up message to the slave device 104. The slave device 104 can obtain a delay time (T2-T1) when the Sync message is transmitted from the master device 102 to the slave device 104, by using the transmission time T1 set in the Follow Up message and the reception time T2 which has been recorded in advance.

Then, in a case of obtaining a delay time when the message is transmitted from the slave device 104 to the master device 102, the slave device 104 transmits a Delay Request message to the master device 102, and records the time T3 at which the message has been transmitted. The master device 102 acquires the time T4 at which the Delay Request has been received, and sets the time T4 in a Delay Response message and transmits the Delay Response message to the slave device 104 as a response. Here, the Delay Request message may be transmitted to the master device 102 immediately after the Sync message is received. The slave device 104 receives a Delay Response message, and can obtain a delay time (T4-T3) when the Delay Request message is transmitted from the slave device 104 to the master device 102, by using the reception time T4 set in the Delay Response message and the transmission time T3 which has been recorded in advance.

An offset time Offset (average of delay times at the time of transmission and reception) is calculated by Equation (1) using four pieces of time information (T1, T2, T3, and T4) acquired in this manner.

$$\text{Offset} = ((T2-T1)+(T4-T3))/2 \quad (1)$$

Here, the time synchronization sequence is a sequence performed between the master device 102 and the slave device 104 periodically or in a predetermined specific period. Time synchronization can be performed in a manner that a time difference between the master device 102 and the slave device 104 is corrected by adding the offset time Offset obtained by Equation (1) to timestamp information received thereafter from the master device 102. For example, a time obtained by adding the offset time Offset obtained by Equation (1) to the transmission time included in the message received from the master device 102 is set in a device internal clock of the slave device 104.

In this manner, the master device 102 and the slave device 104 can achieve time synchronization by correcting the time difference between the master device 102 and the slave device 104.

Here, in the following description, operations and descriptions common to the Sync message, the Follow up message, the Delay Request message, and the Delay Response message are collectively referred to as time synchronization messages. In addition, each of operations and descriptions common to the Sync message, the Follow up message, and the Delay Response message, which are transmitted in a downlink direction from the master device 102 to the slave device 104 are referred to as a "downlink time synchronization message". The Delay Request message transmitted in an uplink direction from the slave device 104 to the master device 102 is referred to as an "uplink time synchronization message".

Figure 3:
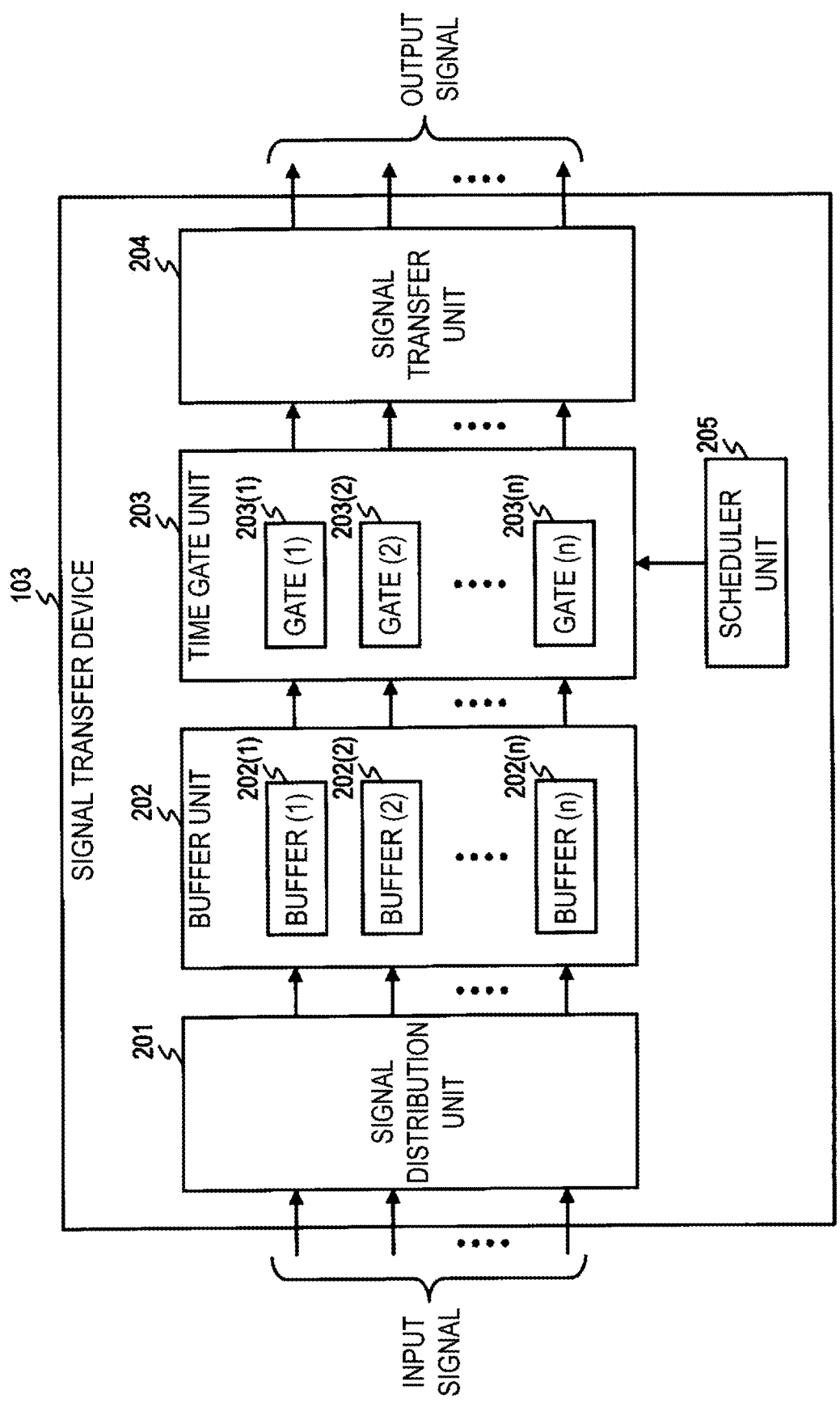
FIG. 3 is a diagram illustrating an example of a configuration of a signal transfer device.

FIG. 3 is a diagram illustrating an example of a configuration of the signal transfer device 103. In FIG. 3, the signal transfer device 103 includes a signal distribution unit 201, a buffer unit 202, a time gate unit 203, a signal transfer unit 204, and a scheduler unit 205.

The signal distribution unit 201 distributes an input signal of the signal transfer device 103 in accordance with the priority and outputs the signal to a buffer having a priority in the buffer unit 202. Although an uplink signal and a downlink signal are not distinguished from each other in FIG. 3, each of the uplink signal and the downlink signal is distributed in accordance with the priority and output to the buffer having a corresponding priority in the buffer unit 202.

The buffer unit 202 is a memory that temporarily stores prioritized signals output from the signal distribution unit 201. The buffer unit 202 includes a plurality of buffers that stores signals in accordance with the priority. In FIG. 3, the buffer unit 202 includes a plurality of buffers, for example, a buffer unit 202(1) being a buffer having the highest priority, a buffer unit 202(2) being a buffer having the second priority, . . . , and a buffer unit 202(n) (n is a positive integer) being a buffer having the lowest priority. In the present embodiment, the time synchronization message is stored in the buffer unit 202(1) having the highest priority. The similar process is executed for each of the uplink signal and the downlink signal.

The time gate unit 203 is a time gate that controls transmission availability based on an instruction of the scheduler unit 205 described later for each of the plurality of buffers in the buffer unit 202. The time gate unit 203 includes a plurality of time gate units 203 corresponding to the plurality of buffer units 202 having different priorities. In FIG. 3, for example, a time gate unit 203(1) controls the transmission availability of the buffer unit 202(1) having the highest priority, a time gate unit 203(2) controls the transmission availability of the buffer unit 202(2) having the second priority, and a time gate unit 203(n) controls the transmission availability of the buffer unit 202(n) having the lowest priority.

The signal transfer unit 204 transfers, to designated output destinations, signals output to each of the plurality of time gate units 203 corresponding to the plurality of buffer units 202 having different priorities.

The scheduler unit 205 controls transmission availability of each of the plurality of time gate units 203 based on schedule information notified from the signal transfer management apparatus 101. Here, the schedule information includes parameters (gate start time, gate opening time, gate opening period, and the like) necessary to open the time gate unit 203. For example, the scheduler unit 205 starts the output from the buffer unit 202(1) to the signal transfer unit 204 at the gate start time of the time gate unit 203(1) in the buffer unit 202(1) having the highest priority, which is described in the schedule information notified from the signal transfer management apparatus 101. Then, the time gate unit 203 outputs the signal of the buffer unit 202(1) to the signal transfer unit 204 for the designated gate opening time, and transmits the signal from the signal transfer unit 204 to a transfer destination.

In this manner, the signal transfer device 103 can control the transmission availability of the time gate unit 203 in accordance with the priorities, based on the schedule information of which the notification is received from the signal transfer management apparatus 101, and can transfer the time synchronization message with the highest priority.

First Embodiment

Figure 4:
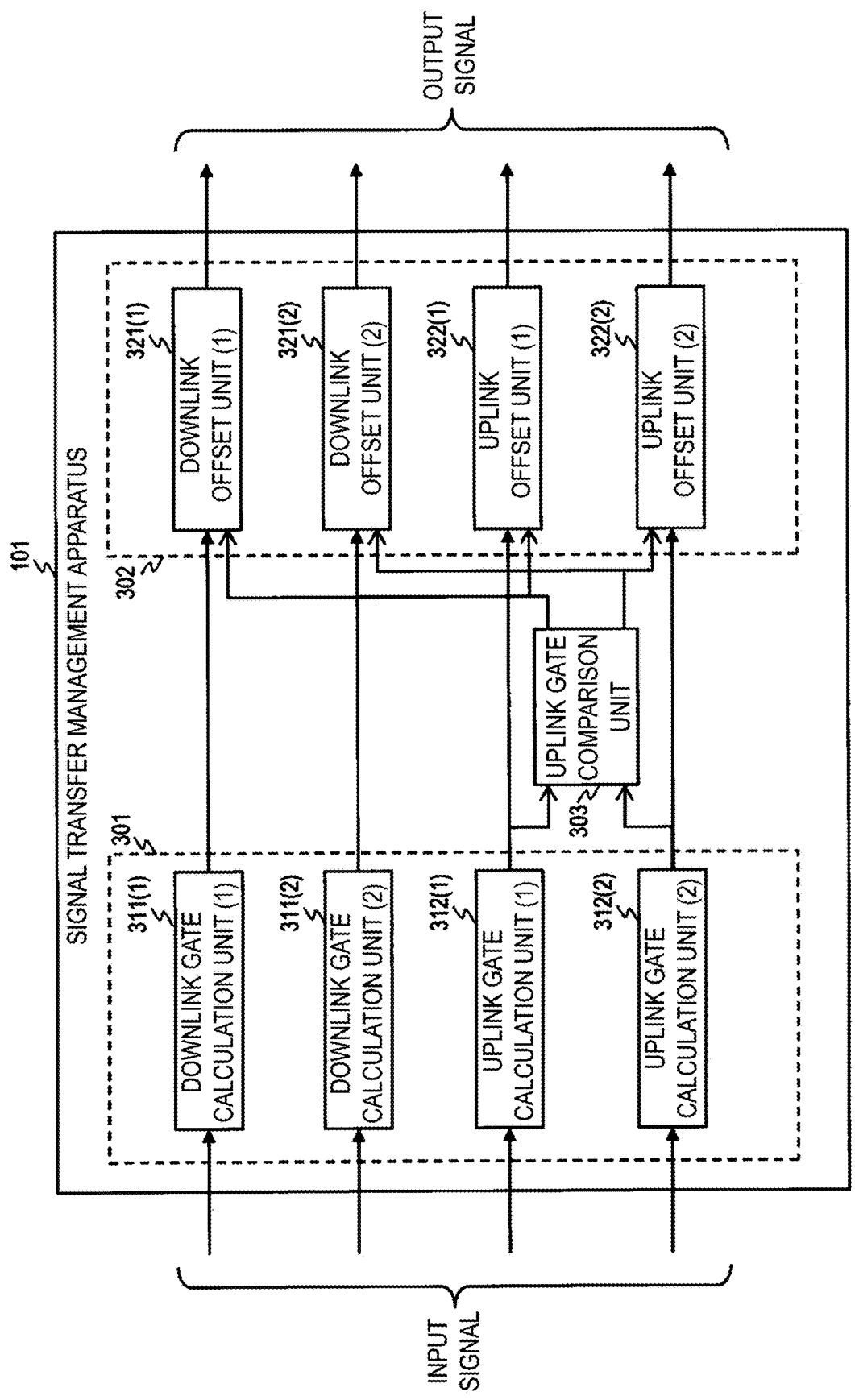
FIG. 4 is a diagram illustrating an example of a configuration of a signal transfer management apparatus according to a first embodiment.

FIG. 4 illustrates an example of a configuration of a signal transfer management apparatus 101 according to a first embodiment. In FIG. 4, the signal transfer management apparatus 101 includes a gate calculation unit 301, an offset unit 302, and an uplink gate comparison unit 303.

The gate calculation unit 301 includes a downlink gate calculation unit 311(1), a downlink gate calculation unit 311(2), an uplink gate calculation unit 312(1), and an uplink gate calculation unit 312(2). The gate calculation unit 301 executes a gate calculation process of calculating an uplink gate start time and a downlink gate start time of the time gate unit 203 in the signal transfer device 103, and opening the respective time gates. Here, when the description common to the downlink gate calculation unit 311(1) and the downlink gate calculation unit 311(2) is given, the (number) at the end of the reference sign is omitted like a "downlink gate calculation unit 311" in the description. This applies to the uplink gate calculation unit 312. The downlink gate calculation unit 311 calculates a parameter necessary for the signal transfer device 103 to open the time gate for the downlink time synchronization message, based on information such as an input time and an input period of the downlink time synchronization message to the signal transfer device 103. The uplink gate calculation unit 312 calculates a parameter necessary for the signal transfer device 103 to open the time gate for the uplink time synchronization message, based on information such as an input time and an input period of the uplink time synchronization message to the signal transfer device 103.

The offset unit 302 includes a downlink offset unit 321(1), a downlink offset unit 321(2), an uplink offset unit 322(1), and the uplink offset unit 322(2). The offset unit 302 executes an offset process of adjusting the uplink gate start time and the downlink gate start time of the time gate unit 203 in the signal transfer device 103 and setting the adjusted gate start times in the signal transfer device 103. Here, when the description common to the downlink offset unit 321(1) and the downlink offset unit 321(2) is given, the (number) at the end of the reference sign is omitted like "downlink offset unit 321" in the description. This applies to the uplink offset unit 322. When an overlap time is input from an uplink gate comparison unit 303 described later, the downlink offset unit 321 notifies the signal transfer device 103 of schedule information setting a gate start time obtained by delaying the gate start time input from the downlink gate calculation unit 311 by the overlap time. When the overlap time is input from the uplink gate comparison unit 303 described later, the uplink offset unit 322 notifies the signal transfer device 103 of schedule information setting a gate start time obtained by delaying the gate start time input from the uplink gate calculation unit 312 by the overlap time.

The uplink gate comparison unit 303 compares gate opening times for opening in the uplink gate calculation unit 312(1) and the uplink gate calculation unit 312(2) with each other, and detects the overlap time in which both gate opening times overlap each other (detection of a conflict). Then, the uplink gate comparison unit outputs the overlap time to the downlink offset unit 321 and the uplink offset unit 322 that notify the signal transfer device 103 having the later gate start time of the schedule information (corresponding to a comparison process). For example, when the signal transfer device 103 having the later gate start time is the signal transfer device 103(1), the overlap time is output to the downlink offset unit 321(1) and the uplink offset unit 322(1) that notify the signal transfer device 103(1) of the schedule information. The downlink offset unit 321(1) and the uplink offset unit 322(1) receive the overlap time, and notify the signal transfer device 103(1) of the schedule information setting gate start times obtained by delaying the gate start times input from the downlink gate calculation unit 311(1) and the uplink gate calculation unit 312(1) by the overlap time.

In this manner, the signal transfer management apparatus 101 according to the first embodiment can avoid a conflict between an uplink time synchronization message transmitted from the slave device 104(1) and an uplink time synchronization message transmitted from the slave device 104(2) in the signal transfer device 103(0) illustrated in FIG. 1. In addition, according to the signal transfer management apparatus 101 according to the first embodiment, the delay time of the downlink time synchronization message is equal to the delay time of the uplink time synchronization message. Thus, it is possible to perform time synchronization between the master device 102 and the slave device 104 without notifying the slave device 104 of an offset amount of the uplink gate start time.

Figure 5:
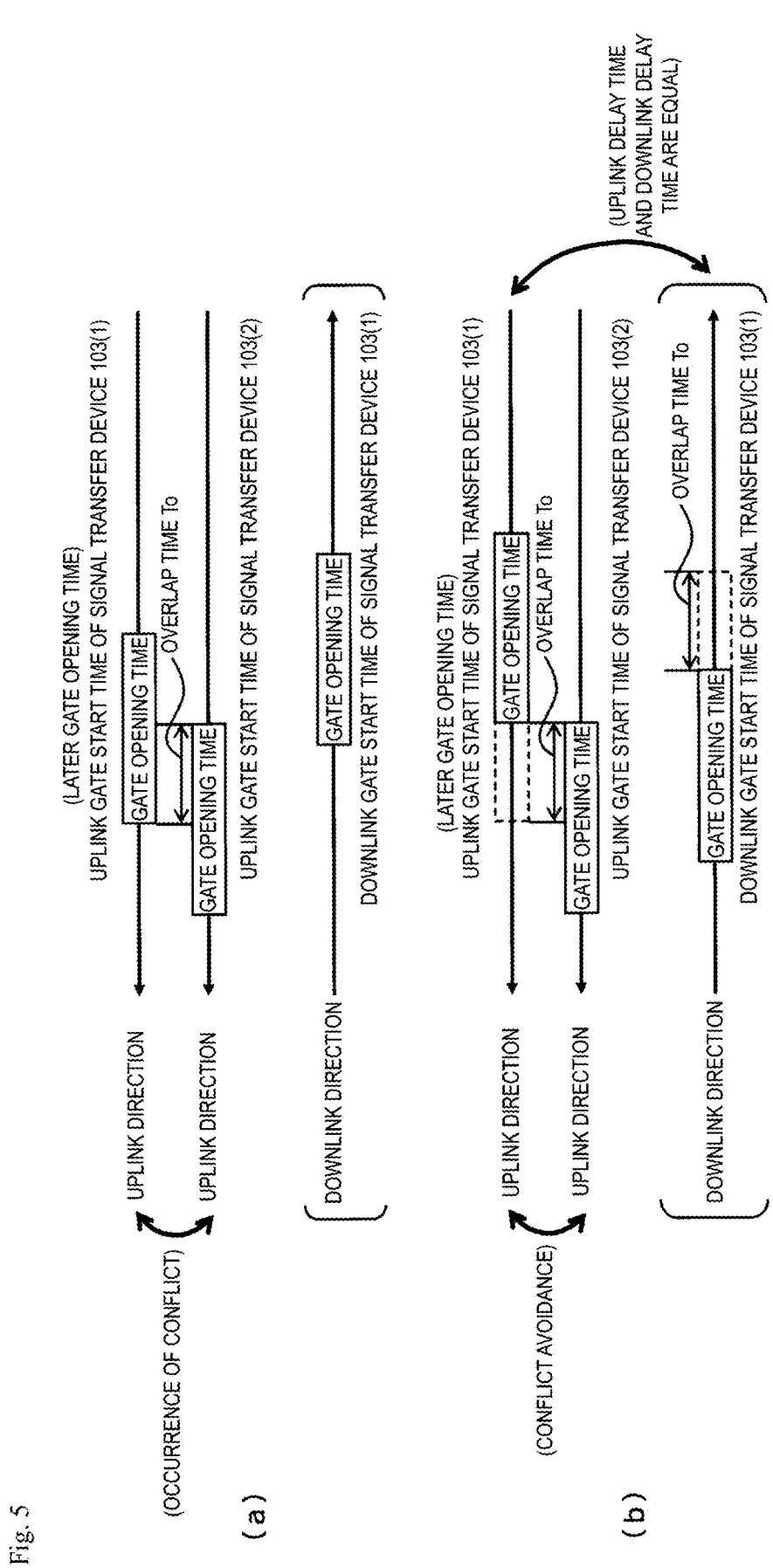
FIG. 5 is a diagram illustrating an effect of the signal transfer management apparatus according to the first embodiment.

FIG. 5 is a diagram illustrating an effect of the signal transfer management apparatus 101 according to the first embodiment. In FIG. 5, the arrow is a time axis indicating a direction in which a signal flows. FIG. 5(a) illustrates a gate opening time in a downlink direction of the signal transfer device 103(1) and a gate opening time in an uplink direction of each of the signal transfer device 103(1) and the signal transfer device 103(2) when the process of adjusting the gate start time is not performed. In FIG. 5(a), the gate opening times of the signal transfer device 103(1) and the signal transfer device 103(2) overlap each other by an overlap time To, and a conflict occurs in an uplink direction of the signal transfer device 103(0). FIG. 5(b) illustrates the gate opening time in a downlink direction of the signal transfer device 103(1) and the gate opening time in an uplink direction of each of the signal transfer device 103(1) and the signal transfer device 103(2) when the process of adjusting the gate start time is executed.

In FIG. 5(b), the signal transfer management apparatus 101 according to the present embodiment notifies the signal transfer device 103(1) of schedule information setting a gate start time obtained by delaying, by the overlap time To, the uplink gate start time of the signal transfer device 103(1) having the later uplink gate start time among the signal transfer devices 103(1) and 103(2). Thus, in FIG. 5(b), the gate opening times of the signal transfer device 103(1) and the signal transfer device 103(2) do not overlap each other. Thus, the conflict is avoided in the uplink direction of the signal transfer device 103(0). In addition, in FIG. 5(b), the signal transfer management apparatus 101 according to the present embodiment notifies the signal transfer device 103(1) of schedule information setting the gate start time obtained by delaying, by the overlap time To, the downlink gate opening time of the signal transfer device 103(1). Thus, the delay times of the signals in the uplink direction and the downlink direction are equal to each other in the signal transfer device 103(1). Thus, it is possible to perform time synchronization between the master device 102 and the slave device 104 without notifying the slave device 104 of the offset amount of the uplink gate start time.

Figure 6:
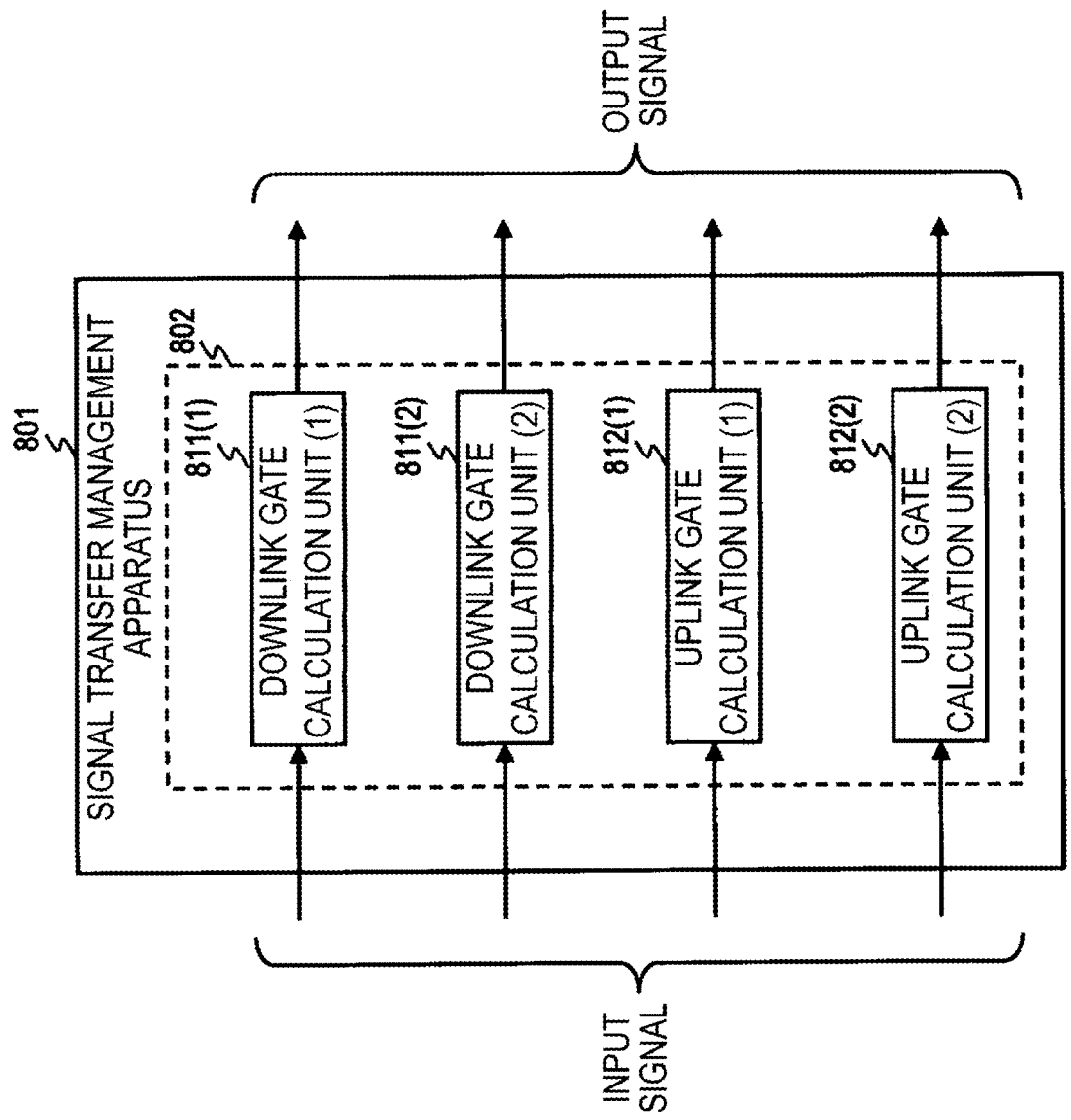
FIG. 6 is a diagram illustrating an example of a configuration of a signal transfer management apparatus in the prior art.

FIG. 6 illustrates an example of a configuration of a signal transfer management apparatus 801 in the related art. In FIG. 6, the signal transfer management apparatus 801 includes a gate calculation unit 802. The signal transfer management apparatus 801 controls a time gate provided in a signal transfer device like the signal transfer management apparatus 101 according to the present embodiment, but does not adjust the gate start time.

The gate calculation unit 802 includes a downlink gate calculation unit 811(1), a downlink gate calculation unit 811(2), an uplink gate calculation unit 812(1), and an uplink gate calculation unit 812(2). Here, the downlink gate calculation unit 811(1), the downlink gate calculation unit 811(2), the uplink gate calculation unit 812(1), and the uplink gate calculation unit 812(2) function similar to the downlink gate calculation unit 311(1), the downlink gate calculation unit 311(2), the uplink gate calculation unit 312(1), and the uplink gate calculation unit 312(2) of the gate calculation unit 301 in the signal transfer management apparatus 101 according to the present embodiment described with reference to FIG. 4. For example, the downlink gate calculation unit 811 calculates a parameter necessary for the signal transfer device 103 to open the time gate for the downlink time synchronization message, based on information such as an input time and an input period of the downlink time synchronization message to the signal transfer device 103, and outputs the calculated parameter to the signal transfer device. The uplink gate calculation unit 312 calculates a parameter necessary for the signal transfer device 103 to open the time gate for the uplink time synchronization message, based on information such as an input time and an input period of the uplink time synchronization message to the signal transfer device 103, and outputs the calculated parameter to the signal transfer device.

Here, as with the time synchronization system 100 according to the present embodiment in FIG. 1, when the plurality of slave devices 104 are subordinate to the master device 102, a conflict between time synchronization messages may occur in the signal transfer device 103 in which the time synchronization messages in the uplink direction from the slave device 104 to the master device 102 are merged. In such a case, when the signal transfer management apparatus 801 in the prior art illustrated in FIG. 6 is applied instead of the signal transfer management apparatus 101 illustrated in FIG. 4, it is possible to avoid delay fluctuation due to congestion from the traffic other than time synchronization messages, but it is not possible to avoid the delay fluctuation due to congestion between time synchronization message and to realize time synchronization with high accuracy. In addition, since the delay fluctuation due to the conflict between time synchronization messages occur only in the uplink direction, the delay times differ between the uplink time synchronization message and the downlink time synchronization message, and the accuracy of time synchronization is decreased in the PTP scheme using the premise that the delay times in the uplink direction and in the downlink direction are equal.

On the other hand, the signal transfer management apparatus 101 according to the present embodiment calculates the overlap time between the uplink time synchronization message and the downlink time synchronization message to set the gate start times in the uplink direction and the downlink direction to the date opening time obtained by delaying the gate start times by the overlap time. Thus, it is possible to avoid a conflict of the uplink time synchronization message. In the signal transfer management apparatus 101 according to the present embodiment, the delay time of the downlink time synchronization message is equal to the delay time of the uplink time synchronization message. Thus, it is possible to perform time synchronization between the master device 102 and the slave device 104 without notifying the slave device 104 of an offset amount of the uplink gate start time.

Second Embodiment

Figure 7:
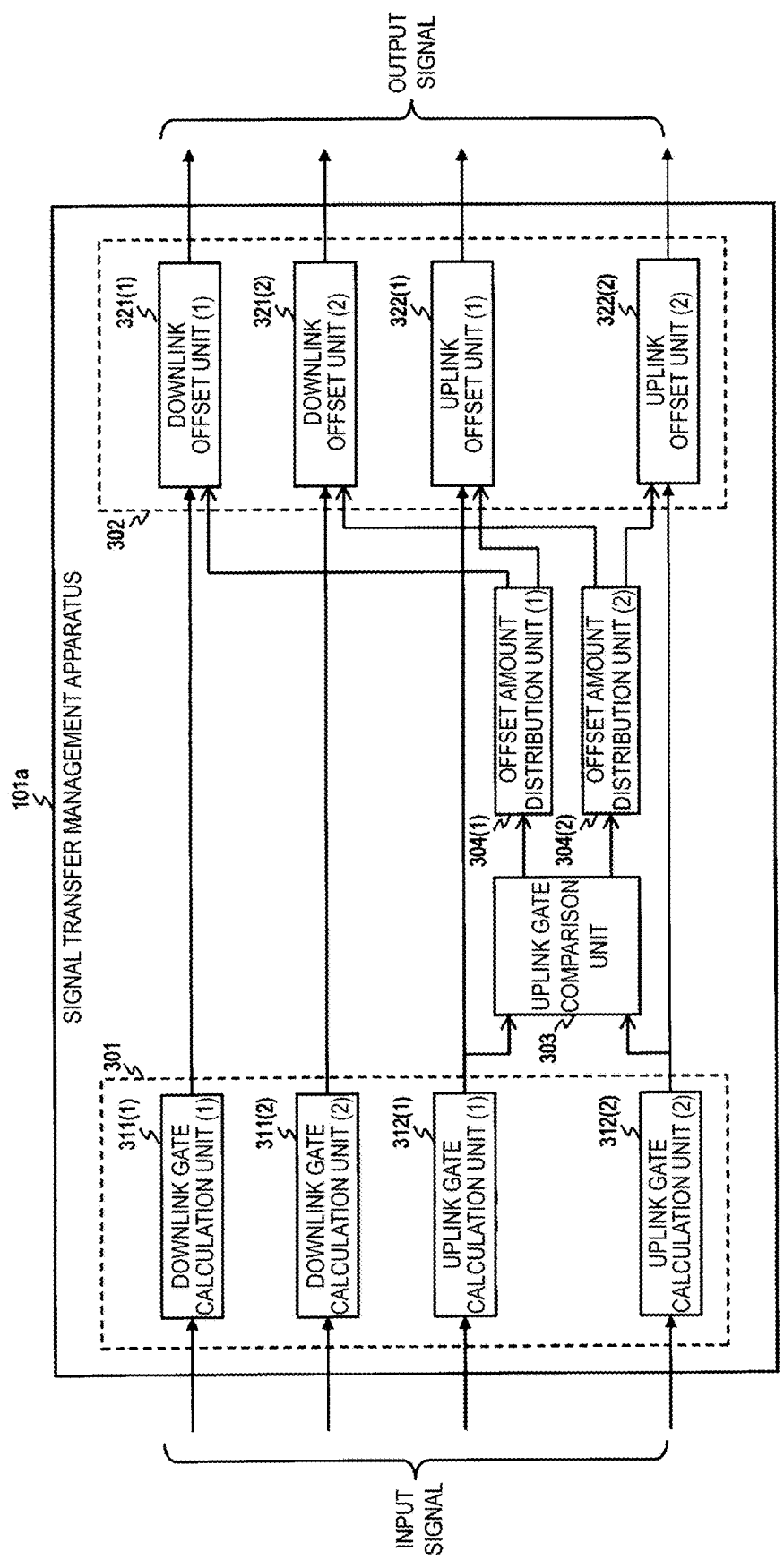
FIG. 7 is a diagram illustrating an example of a configuration of a signal transfer management apparatus according to a second embodiment.

FIG. 7 is a diagram illustrating an example of a configuration of a signal transfer management apparatus 101a according to a second embodiment. In FIG. 7, the signal transfer management apparatus 101a includes a gate calculation unit 301, an offset unit 302, an uplink gate comparison unit 303, and an offset amount distribution unit 304. Here, in FIG. 7, the basic operations of the gate calculation unit 301, the offset unit 302, and the uplink gate comparison unit 303 having the same reference signs as in FIG. 4 are the same as those in the signal transfer management apparatus 101 according to the first embodiment. Thus, repetitive descriptions will be omitted, and differences from the first embodiment will be described. In the second embodiment, it is assumed that, in FIG. 2 described above, the slave device 104 transmits a Delay Request message immediately after receiving a Sync message from the master device 102.

In FIG. 7, the uplink gate comparison unit 303 detects an overlap time for the gate opening time for opening in the uplink gate calculation unit 312(1) and the uplink gate calculation unit 312(2), and outputs the overlap time to an offset amount distribution unit 304 (offset amount distribution unit 304(1) and offset amount distribution unit 304(2)) described later.

The offset amount distribution unit 304 includes an offset amount distribution unit 304(1) and an offset amount distribution unit 304(2) and executes an offset amount distribution process of outputting a time being ½ of the overlap time obtained by dividing the overlap time input from the uplink gate comparison unit 303 into halves, to the downlink offset unit 321(1), the downlink offset unit 321(2), the uplink offset unit 322(1), and the uplink offset unit 322(2).

In a case where one half of the overlap time is input from the offset amount distribution unit 304(1), the downlink offset unit 321(1) outputs schedule information in which the gate start time input from the downlink gate calculation unit 311(1) is delayed by one half of the overlap time, to the corresponding signal transfer device 103(1).

In a case where one half of the overlap time is input from the offset amount distribution unit 304(2), similar to the downlink offset unit 321(1), the downlink offset unit 321(2) outputs, to the corresponding signal transfer device 103(2), schedule information in which the gate start time input from the downlink gate calculation unit 311(2) is delayed by one half of the overlap time.

In a case where one half of the overlap time is input from the offset amount distribution unit 304(1), the uplink offset unit 322(1) outputs, to the corresponding signal transfer device 103(1), the schedule information in which the gate start time input from the uplink gate calculation unit 312(1) by one half of the overlap time.

In a case where one half of the overlap time is input from the offset amount distribution unit 304(2), similar to the uplink offset unit 322(1), the uplink offset unit 322(2) outputs, to the corresponding signal transfer device 103(2), schedule information in which the gate start time input from the uplink gate calculation unit 312(2) is delayed by one half of the overlap time.

In this manner, the signal transfer management apparatus 101a according to the second embodiment can avoid a conflict between an uplink time synchronization message transmitted from the slave device 104(1) and an uplink time synchronization message transmitted from the slave device 104(2) in the signal transfer device 103(0) illustrated in FIG. 1. In addition, according to the signal transfer management apparatus 101a according to the second embodiment, the delay time of the downlink time synchronization message is equal to the delay time of the uplink time synchronization message. Thus, it is possible to perform time synchronization between the master device 102 and the slave device 104 without notifying the slave device 104 of an offset amount of the uplink gate start time.

Here, in the second embodiment, the slave device 104 transmits the Delay Request message immediately after receiving the Sync message from the master device 102. Thus, the premise is that, when the reception of the Sync message is delayed, the transmission of the Delay Request message is also delayed. In this case, in the signal transfer device 103(1), the Sync message being the downlink time synchronization message is delayed by one half of the overlap time. Thus, the Delay Request message transmitted immediately after the slave device 104 receives the Sync message is also delayed by one half of the overlap time. In addition, the Delay Request message being the uplink time synchronization message is delayed in the signal transfer device 103(1) by one half of the overlap time. Thus, the Delay Request message is delayed from the initial gate start time by the overlap time, and it is possible to avoid a conflict with the uplink time synchronization message of the signal transfer device 103(2). In the signal transfer device 103(1), each of the uplink gate start time and the downlink gate start time is delayed by one half of the overlap time. Thus, the delay time of the uplink time synchronization message and the delay time of the downlink time synchronization message in the signal transfer device 103(1) are equal to each other, and it is possible to perform time synchronization between the master device 102 and the slave device 104 without notifying the slave device 104 of the offset amount of the uplink gate start time.

Figure 8:
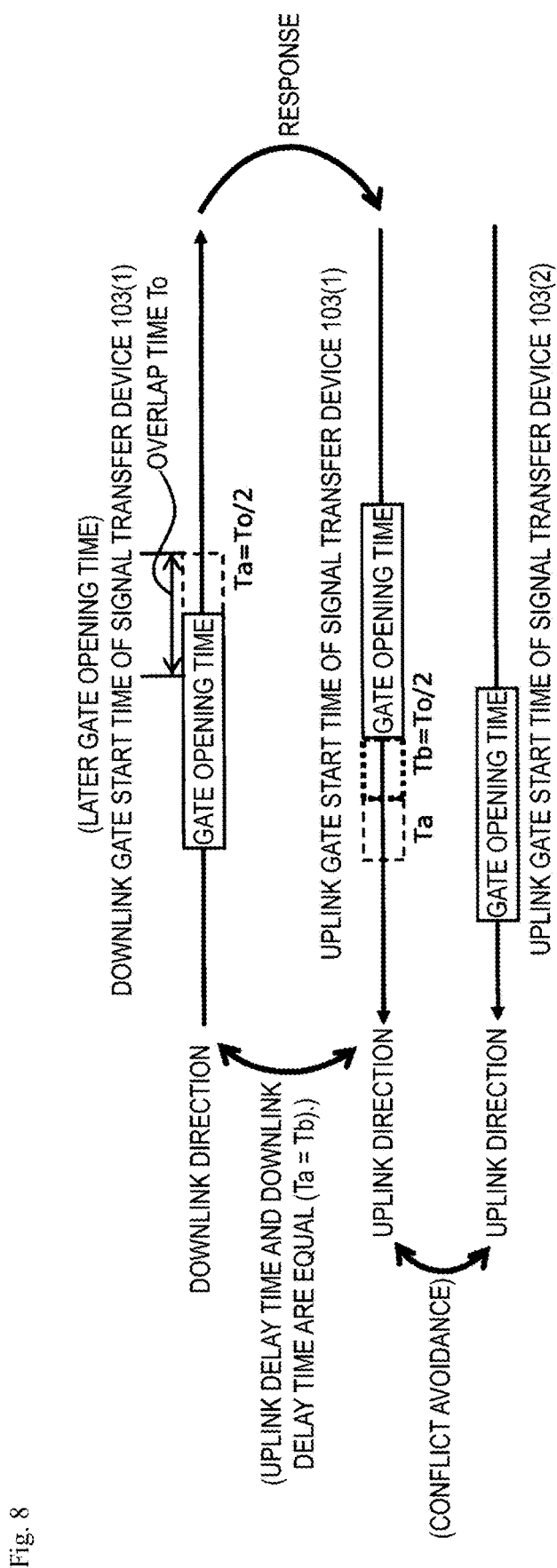
FIG. 8 is a diagram illustrating an effect of the signal transfer management apparatus according to the second embodiment.

FIG. 8 is a diagram illustrating an effect of the signal transfer management apparatus 101a according to the second embodiment. In FIG. 8, the arrow is a time axis indicating the direction in which the signal flows, and indicates the gate opening time in the respective uplink directions of the signal transfer device 103(1) and the signal transfer device 103(2), and the gate opening time in the downlink direction of the signal transfer device 103(1). Here, as illustrated in (a) of FIG. 5, it is assumed that the gate opening times in the uplink directions of the signal transfer device 103(1) and the signal transfer device 103(2) overlap each other and a conflict occurs.

In FIG. 8, the signal transfer management apparatus 101*a* according to the second embodiment notifies the signal transfer device 103(1) of schedule information setting a gate start time obtained by delaying, by one half Tb of the overlap time To, the uplink gate start time of the signal transfer device 103(1) having the later uplink gate start time among the signal transfer devices 103(1) and 103(2), and notifies the signal transfer device 103(1) of schedule information setting a gate start time obtained by delaying, by one half Ta of the overlap time To, the downlink gate start time of the signal transfer device 103(1).

Thus, the signal in the downlink direction of the signal transfer device 103(1) is delayed by one half Ta of the overlap time To. Thus, for example, in FIG. 1, the slave device 104 receives the Sync message delayed by the time Ta. When the slave device 104 transmits the Delay Request message to the master device 102 immediately after receiving the Sync message, the signal (Delay Request message) in the uplink direction is delayed by the time Tb in the signal transfer device 103(1). Thus, the uplink gate start time of the signal transfer device 103(1) is delayed from the uplink gate start time of the signal transfer device 103(2) by a time of (Ta+Tb)=To, and thus a conflict between the gate opening time of the signal transfer device 103(1) and the gate opening time of the signal transfer device 103(2) is avoided.

In addition, in FIG. 8, the signal transfer management apparatus 101*a* according to the present embodiment notifies the signal transfer device 103(1) of schedule information setting the gate start time obtained by delaying the gate opening time in the downlink direction of the signal transfer device 103(1) by the time Ta being one half of the overlap time To and delaying the gate opening time in the uplink direction of the signal transfer device 103(1) by the time Tb being one half of the overlap time To. Thus, the delay time of the signals in the uplink direction and the downlink direction are equal to each other in the signal transfer device 103(1). Thus, it is possible to perform time synchronization between the master device 102 and the slave device 104 without notifying the slave device 104 of the offset amount of the uplink gate start time.

Here, a program corresponding to the process executed by each block of the signal transfer management apparatus 101 according to the first embodiment illustrated in FIG. 4 or the signal transfer management apparatus 101*a* according to the second embodiment illustrated in FIG. 7 may be executed by a computer. The program may be provided being recorded on a recording medium, or may be provided via a network.

As described in each of the embodiments, according to the signal transfer management apparatus, the signal transfer management method, and the signal transfer management program according to the present invention, it is possible to avoid a conflict between uplink time synchronization messages in a signal transfer device and eliminate a difference in delay time between an uplink time synchronization message and a downlink time synchronization message, to improve the accuracy of time synchronization.

REFERENCE SIGNS LIST

101, 101*a*, 801 Signal transfer management apparatus
102 Master device
103 Signal transfer device
104 Slave device
201 Signal distribution unit
202 Buffer unit
203 Time gate unit 203
204 Signal transfer unit
205 Scheduler unit
301, 802 Gate calculation unit
302 Offset unit
303 Uplink gate comparison unit
304 Offset amount distribution unit
311, 811 Downlink gate calculation unit
312, 812 Uplink gate calculation unit
321 Downlink offset unit
322 Uplink offset unit

The invention claimed is:

1. A signal transfer management apparatus that manages operation of a plurality of signal transfer devices forming a packet network, where the plurality of signal transfer devices are interconnected between a master device and a plurality of slave devices, the signal transfer management apparatus comprising:
   a gate calculation unit configured to calculate a gate start time of an uplink time gate and a gate start time of a downlink time gate of each of the plurality of signal transfer devices and open each time gate;
   a comparison unit configured to compare a plurality of uplink time synchronization messages from the plurality of slave devices to the master device to detect a conflict between the plurality of uplink time synchronization messages; and
   an offset unit configured to, when the comparison unit detects a conflict between the plurality of uplink time synchronization messages of the plurality of signal transfer devices, adjust the gate start time of the uplink time gate and the gate start time of the downlink time gate of each of the plurality of signal transfer devices and set the adjusted gate start time of the uplink time gate and the adjusted gate start time of the downlink time gate in each of the plurality of signal transfer devices.

2. The signal transfer management apparatus according to claim 1, wherein
   the comparison unit is configured to
   detect an overlap time at which the plurality of compared uplink time synchronization messages from the plurality of signal transfer devices overlap each other, and output the overlap time to the offset unit as an offset of a given signal transfer device having a late gate start time of the uplink time gate, and
   the offset unit is configured to set, in the given signal transfer device, a gate start time obtained by delaying, by the overlap time, the gate start time of the uplink time gate and the gate start time of the downlink time gate in the given signal transfer device having the late gate start time of the uplink time gate.

3. The signal transfer management apparatus according to claim 2, further comprising:
   an offset amount distribution unit configured to output, to the offset unit, one half of the overlap time as an offset of an uplink gate start time and an offset of a downlink gate start time of the signal transfer device having the late gate start time of the uplink time gate,
   wherein the offset unit is configured to set, in the signal transfer device, the gate start time obtained by delaying, by one half of the overlap time, the gate start time of the uplink time gate and the gate start time of the downlink gate start time in the signal transfer device having the late gate start time of the uplink time gate.

4. A signal transfer management method of managing operation of a plurality of signal transfer devices forming a packet network, where the plurality of signal transfer devices are interconnected between a master device and a plurality of slave devices the signal transfer management method comprising:
- a gate calculation process of calculating a gate start time of an uplink time gate and a gate start time of a downlink time gate of each of the plurality of signal transfer devices and open each time gate;
- a comparison process of comparing a plurality of uplink time synchronization messages from the plurality of slave devices to the master device to detect a conflict between the plurality of uplink time synchronization messages; and
- an offset process of, when the comparison process detects a conflict between the plurality of uplink time synchronization messages of the plurality of signal transfer devices, adjusting the gate start time of the uplink time gate and the gate start time of the downlink time gate of each of the plurality of signal transfer devices and set the adjusted gate start time of the uplink time gate and the adjusted gate start time of the downlink time gate in each of the plurality of signal transfer devices.

5. The signal transfer management method according to claim 4, wherein
- the comparison process includes detecting an overlap time at which the plurality of compared uplink time synchronization messages from the plurality of signal transfer devices overlap each other, and outputting the overlap time to the offset process as an offset of a given signal transfer device having a late gate start time of the uplink time gate, and
- the offset process includes setting, in the given signal transfer device, a gate start time obtained by delaying, by the overlap time, the gate start time of the uplink time gate and the gate start time of the downlink time gate in the given signal transfer device having the late gate start time of the uplink time gate.

6. The signal transfer management method according to claim 5, further comprising:
- an offset amount distribution process of outputting, to the offset process, one half of the overlap time as an offset of an uplink gate start time and an offset of a downlink gate start time of the signal transfer device having the late gate start time of the uplink time gate,
- wherein, the offset process includes setting, in the signal transfer device, the gate start time obtained by delaying, by one half of the overlap time, the gate start time of the uplink time gate and the gate start time of the downlink gate start time in the signal transfer device having the late gate start time of the uplink time gate.

7. A non-transitory computer-readable medium having computer-executable instructions that, upon execution of the instructions by a processor of a computer, cause the computer to perform the signal transfer management method according to claim 4.

* * * * *